Patented Jan. 10, 1939

2,143,530

UNITED STATES PATENT OFFICE 2,143,530

METHOD OF SEEDING TITANIUM SALT SOLUTIONS

Benjamin Wilson Allan, Baltimore, Md.

No Drawing. Application March 14, 1936, Serial No. 68,917

11 Claims. (Cl. 134—58)

This application is in part a continuation of my application Serial #731,998, filed June 22, 1934 now Patent No. 2,040,823, dated May 19, 1936.

This invention relates to the production of titanium dioxide, primarily intended for pigment purposes, and has particular reference to a new and novel method of preparing a let-down titanium dioxide, with covering and tinting strength equal to that obtainable with pure titanium dioxide. It has further reference to a new and novel method of accelerating the hydrolysis of titanium sulfate solutions, by using as a seeding agent a composite gel of silicon and titanium oxides, produced by intermixing a solution of sodium silicate and a titanium salt solution, which precipitates with the titanium hydrate to form a composite pigment whose covering and tinting strength are equal to that of pure titanium dioxide.

Titanium oxide is one of the most popular of the pigments used in the paint industry, because of its chemical inertness and its exceptionally good covering power. It is ordinarily made from rutile (a native titanium oxide mineral) or from ilmenite (an iron titanate mineral). The titanium is put into solution in any desired manner, such as by fusion with an alkali or by attack of the mineral with strong sulfuric acid. The solutions are ordinarily purified by removal, to some extent, of their iron content. In order to get titanium oxide of good pigmentary properties it has been found necessary to hydrolize the titanium oxide from fairly acid solutions, rather than to precipitate the oxide with alkaline materials.

The most economical method for the production of titanium oxide is to start with the mineral ilmenite and attack the mineral with hot concentrated sulfuric acid, generally using sufficient sulfuric acid to form normal salts with all of the iron and titanium present. The attack mass is then leached with water or with weak sulfuric acid, recovered later in the process, the resulting solution containing titanium and iron sulfates with some free acid. In some cases it is advantageous to use smaller percentages of sulfuric acid, in which case the titanium is present as a compound between $TiOSO_4$ and $Ti(SO_4)_2$. The amount of sulfuric acid in the solution is expressed as factor of acidity (F. A.), $TiOSO_4$ representing zero factor of acidity and $Ti(SO_4)_2$ representing 100% F. A.

The sulfate solutions are then reduced so that the iron is present in the ferrous condition, so that iron will not precipitate upon hydrolysis of the solutions. Suspended matter is ordinarily removed by filtration or other form of clarification and the solution is then ready for hydrolysis.

Some solutions are hydrolizable by mere boiling, but solutions made by treatment of ilmenite with acid in the manner above described, produce rather poor yields of titanium oxide on simple boiling. This difference in solutions I attribute to the form of the titanium oxide before solution. Where solutions are made from ortho titanic acid or where ortho titanic acid has been formed and redissolved, hydrolysis is a simple process; where the titanium oxide is dissolved from other modifications, the process of hydrolysis becomes more difficult. The difference is probably due to the fact that ortho titanic acid goes into colloidal rather than into true solution.

Various investigators have suggested different methods of producing solutions which are readily hydrolizable, in every case adding to the solution some titanium oxide which has been precipitated in the form of ortho titanic acid, or which goes into colloidal rather than true solution. In some cases the precipitate is formed in the solution and later dissolved, the hydrolysis being one continuous operation. In other cases a titanium oxide seeding agent is prepared on the outside and thereafter added to the solution. These seeding agents have required careful preparation and handling.

In my co-pending application Serial #731,998, filed June 22, 1934, now Patent No. 2,040,823, dated May 19, 1936, I have disclosed a method of precipitating titanium dioxide which comprises using a gel of titanium dioxide as the seeding agent, to accelerate the hydrolysis. This method requires the precipitation of titanium oxide as a gel with caustic soda; the method is characterized by the small amount of gel necessary to produce satisfactory hydrolysis.

I have now discovered that if a soluble silicate is used to prepare the gel, a composite titanium dioxide-silica gel is formed, which accelerates the hydrolysis as well as the pure titanium gel. I have discovered further that a soluble silicate may be added to a titanium salt solution directly, and the hydrolysis appears to be accelerated by the colloidal gelatinous silicon dioxide-titanium oxide gel formed in situ, without the use of any other seeding agents. The resultant composite crude silica-titanium oxide precipitate, when washed, dried and calcined, gives a composite pigment in which the silica, in small percentages, does not reduce the covering and tinting strength of the pigment, up to about 7% $SiO_2$ in the finished composition. The tinting strength falls with further additions of silica, but not in proportion to the dilution. I prefer, however, to use no more than enough soluble silicate to produce a pigment substantially equal to pure titanium dioxide.

As an example of my invention, I took a typical hydrolysis solution, with the following composition:

Example 1

| | |
|---|---|
| $TiO_2$ _____grams per liter__ | 191 |
| Fe_____do____ | 139 |
| Total $H_2SO_4$_____do____ | 615 |
| Free acid _____do____ | 136 |
| Active acid_____do____ | 370 |
| Factor of acidity_____per cent__ | 58 |

Two thousand cc. of the above solution were added with stirring to 200 cc. of sodium silicate solution containing 10% $SiO_2$, and the mixture boiled for 8 hours. A 91% yield of $TiO_2$ was obtained; the product was calcined under standard conditions, to give a very soft pigment containing a substantial percentage of $SiO_2$, but with a tinting strength equal to that obtained by hydrolizing the above solution with titanium oxide gel, and calcining under the same conditions.

Example 2

A composite $TiO_2$—$SiO_2$ gel was obtained by intermixing the following solutions Analysis of titanium sulfate solution

| | |
|---|---|
| $TiO_2$ _____grams per liter__ | 271 |
| Fe _____do____ | 52 |
| $H_2SO_4$ _____do____ | 609 |
| Free A_____do____ | 186 |
| A. A._____do____ | 518 |
| F. A._____per cent__ | 56 |

Analysis of sodium silicate solution

| | |
|---|---|
| NaOH_____grams per liter__ | 160 |
| $SiO_2$_____do____ | 330 |
| S. G._____per cent__ | 1.38 |

The gel was formed by adding 263 cc. of the sodium silicate solution to 100 cc. of the titanium solution. A short time after the last of the silicate was added, the mixture set to a firm gel. This gel was allowed to air dry and then used as a seeding agent for the hydrolysis of a titanium sulfate solution.

A solution of substantially the same composition as that of Example 1 was heated to the boiling point, and 2% (in terms of the titanium dioxide in the gel) of the composite gel was added at the boiling point. Since the ratio of the silicon dioxide to the titanium dioxide was three to one, this should produce a composite pigment containing approximately 6% $SiO_2$. Hydrolysis was continued for 8 hours; a 90% yield was obtained. The calcined pigment contained on analysis 6.5% $SiO_2$ and 93.5% $TiO_2$; it was substantially equal in tinting strength to a 100% $TiO_2$.

Example 3

One thousand cc. of the titanium sulfate solution of Example 1 were heated to boiling, and 50 cc. of a 25% $SiO_2$ sodium silicate solution were added. A 92% yield was obtained after 8 hours; a very soft pigment of high tinting strength was obtained, containing a substantial percentage of $SiO_2$.

While I have shown only one solution in my examples, I have found that the addition of a pre-formed composite gel of silicon dioxide-titanium dioxide or a soluble silicate which forms the gel in situ, will hydrolize titanium salt solutions of other acidity, concentrations and general composition, and that the colloidal titanium dioxide-silicon dioxide acts, so added, as a hydrolysis inducer generally for hydrolizable titanium salt solutions.

A hydrolysis was made in which I used a quantity of silica gel equal to the composite gel alone but there was no acceleration in the rate of hydrolysis of the titanium sulfate solution due to the presence of the silica alone.

I am familiar with the fact that the use of colloidal silica alone is suggested by the Stephens Patent 1,748,429 of February 25, 1930 and by the Goldschmidt Patent 1,343,447 of June 15, 1920, but as indicated, this does not produce results comparable to the use of a composite gel.

The principal advantage of the use of my silica-titanium oxide accelerators lies in the low cost of the accelerator, and the reduction of cost of the final pigment due to incorporation of silica therein without loss of pigment properties. In addition, an unusually good accelerating effect is obtained, even as compared to the best prior art accelerators.

I claim:

1. The method of accelerating the hydrolysis of titanium salt solutions which comprises intermixing a soluble silicate and a hydrolizable titanium salt solution, and heating.

2. The method of accelerating the hydrolysis of titanium sulfate solutions which comprises intermixing a soluble silicate and a hydrolizable titanium sulfate solution, and heating.

3. The method of claim 5 in which the silica is present in such quantity as to produce a finished titanium pigment containing not over 7% of silica, the pigment being characterized by a tinting strength substantially equal to that of pure titanium dioxide.

4. The method of accelerating the hydrolysis of titanium salt solutions which comprises heating a hydrolizable titanium salt solution having admixed therewith a gel formed by the process comprising intermixing an alkali metal silicate and a titanium salt solution.

5. The method of accelerating the hydrolysis of a titanium salt solution which comprises heating a hydrolizable titanium salt solution having mixed therewith a composite silica-titanium dioxide gel.

6. The process of claim 5 in which the hydrolysis solution is a titanium sulfate solution.

7. The method of accelerating the hydrolysis of a titanium salt solution which comprises mixing a separately prepared silica-titanium dioxide gel with a hydrolizable titanium salt solution and heating.

8. The method of accelerating the hydrolysis of a titanium sulfate solution which comprises mixing a separately prepared silica-titanium dioxide gel with a hydrolizable titanium sulfate solution and heating.

9. The method of accelerating the hydrolysis of titanium salt solutions which comprises intermixing an alkali metal silicate and a titanium salt solution to form a composite silica-titanium dioxide gel, and heating a hydrolizable titanium salt solution in admixture with the gel so formed.

10. The method of accelerating the hydrolysis of a titanium sulfate solution which comprises intermixing an alkali metal silicate and a titanium salt solution to form a composite silica-titanium dioxide gel, and heating a hydrolizable titanium sulfate solution in admixture with the gel so formed.

11. The method of accelerating the hydrolysis of a titanium sulfate solution which comprises intermixing an alkali metal silicate with a titanium salt solution to form a composite silica-titanium dioxide gel, adding the gel to a hydrolizable titanium salt solution and heating the mixture of gel and titanium sulfate solution.

BENJAMIN WILSON ALLAN.